United States Patent [19]
Grunzinger

[11] Patent Number: 4,808,471
[45] Date of Patent: Feb. 28, 1989

[54] FLAT TRANSPARENT TOP COAT FOR RETROREFLECTIVE SHEETING

[75] Inventor: Raymond E. Grunzinger, St. Paul, Minn.

[73] Assignee: Minnesota Mining and Manufacturing Company, St. Paul, Minn.

[21] Appl. No.: 142,326

[22] Filed: Jan. 4, 1988

Related U.S. Application Data

[63] Continuation of Ser. No. 45,270, Apr. 30, 1987, abandoned, which is a continuation of Ser. No. 707,199, Mar. 1, 1985, abandoned.

[51] Int. Cl.⁴ ............................................. G02B 5/12
[52] U.S. Cl. ................................... 428/325; 428/327; 428/423.1; 428/423.3; 428/913; 528/60; 528/65; 528/66
[58] Field of Search ............... 428/325, 327, 423.1, 428/423.3, 913; 528/60, 66, 65

[56] References Cited

U.S. PATENT DOCUMENTS

| | | | |
|---|---|---|---|
| 2,407,680 | 3/1945 | Palmquist et al. | 88/82 |
| 3,190,178 | 6/1961 | McKenzie | 88/82 |
| 3,245,941 | 4/1966 | Mayer et al. | 260/31.6 |
| 3,689,346 | 9/1970 | Rowland | 156/245 |
| 3,912,754 | 10/1975 | Findelsen et al. | 260/309 |
| 4,025,674 | 5/1977 | Mizuochi | 428/29 |
| 4,338,256 | 7/1982 | Fijinami et al. | 260/453 |
| 4,360,603 | 11/1982 | Grogler et al. | 521/159 |
| 4,367,920 | 1/1983 | Tung et al. | 350/105 |
| 4,377,530 | 3/1983 | Trenbeath et al. | 260/453 |
| 4,379,767 | 4/1983 | Alexanian et al. | 260/453 |
| 4,379,905 | 4/1983 | Stemmler et al. | 528/73 |
| 4,439,370 | 3/1984 | Zengel et al. | 260/453 |
| 4,505,967 | 3/1985 | Bailey et al. | 428/325 |
| 4,663,213 | 5/1987 | Bailey et al. | 428/325 |
| 4,664,966 | 5/1987 | Bailey et al. | 428/325 |
| 4,725,494 | 2/1988 | Belisle et al. | 428/325 |

Primary Examiner—Sharon A. Gibson
Attorney, Agent, or Firm—Donald M. Sell; Roger R. Tamte

[57] ABSTRACT

The novel retroreflective sheeting has a flat transparent top coat which is as tough and as resistant to solvents and abrasion as are alkyd resins, and as weather resistant as are acrylic polyesters. That top coat is made from a mixture of hydroxy-functional acrylic polyol and a curing agent which is an aliphatic polyfunctional isocyanate such as the biuret of 1,6-hexamethylene diisocyanate. The retroreflective sheeting may have a dual-layer top coat, the outer layer being relatively hard to provide good resistance to solvents, abrasion and weathering, and the inner layer being softer to make the sheeting more conformable.

14 Claims, 1 Drawing Sheet

4,808,471

FLAT TRANSPARENT TOP COAT FOR RETROREFLECTIVE SHEETING

This is a continuation of application Ser. No. 045,270 filed Apr. 30, 1987, abandoned, which is a continuation of application Ser. No. 707,199, filed Mar. 1, 1985, abandoned.

FIELD OF THE INVENTION

The invention concerns retroreflective sheeting which has a flat transparent top coat and specifically concerns the top coat.

BACKGROUND ART

The enclosed-lens retroreflective sheeting shown in FIG. 1 of U.S. Pat. No. 2,407,680 (Palmquist et al.) has in sequence a back reflector 10, a transparent spacing film 11 (more recently and here called a "space coat"), a monolayer of glass microspheres 13 partially embedded in a transparent binder coating 12 (more recently and here called a "bead-bond layer"), and a transparent covering 14 having a flat front face (more recently and here called a "top coat"). By having a flat front face, the top coat provides a number of advantages discussed at columns 16 and 17 of the patent, e.g., rain does not "black out" the reflex reflection. The top coat may be coated from solution as in Example 1 of the Palmquist patent, or it may be a preformed plastic film such as the polymethylmethacrylate film 26 of Example 1 of U.S. Pat. No. 4,367,920 (Tung et al.). The top coat of the retroreflective sheeting of FIG. 2 of the Palmquist patent consists of two layers 14 and 15. In retroreflective sheeting now on the market wherein the top coat consists of two layers, the outer layer is relatively hard to provide good resistance to abrasion, and the inner layer is softer to make the sheeting more conformable.

Although as sold, the top coat is usually at the surface of such retroreflective sheeting, purchasers usually apply over the top coat "lettering, symbols, designs, etc., by affixing thereto transparent colored films cut to the required shapes, or by painting with transparent colored paint; thereby forming an overlying transparent colored film or coating 16 indicated in FIG. 2, which acts as a colored filter . . . " (Palmquist patent, col. 11, lines 30–37).

While the retroreflective sheetings of FIGS. 1 and 2 of the Palmquist patent were built up from the back reflector 10, they may be made by an inverse procedure as described at the top of column 12 and illustrated in FIG. 3, building upon a top coat, there called a "flat-faced transparent front covering 17". First, a bead-bond layer is applied to the top coat, and then the glass microspheres are embedded in the surface of the bead-bond layer. Usually the microspheres are then covered with a space coat, and a thin-film reflective layer is depsoited onto the space coat. The exposed face of the reflective layer may then be adhesively bonded to a carrier.

Although the top coat of each of the examples of the Palmquist patent is an acrylic polyester, the top coat of almost all such retroreflective sheeting sold until the mid 1960's was an alkyd resin from vegetable oils. Unfortunately, fungus often pits the alkyd resin surface, especially when the humidity was high. Better resistance to fungus was achieved by substituting saturated polyesters for the vegetable oils, but this resulted in cracking during cold weather. Although this substitution reduced the yellowing experienced by alkyd resins, there continued to be a problem of yellowing from weathering.

While the acrylic polyesters of the Palmquist patent have good weather resistance and have been used for that reason, those that form a hard surface are quite brittle and hence tend to crase and crack while being applied. Softer acrylic polyesters are tougher, but are less resistant to weathering.

One reason alkyd resins have been used for top coats of retroreflective sheeting in spite of their weathering problems is that they have good resistance to solvents with which users like to clean the sheeting. Acrylic polyesters have poor solvent resistance. Another reason is that alkyd resins tend to afford better abrasion resistance than do acrylic polyesters.

Two examples of commercial retroreflective sheetings sold in recent years are as follows. In the first example, the top coat is believed to be two acrylic polyester layers, each of which is a hydroxy-functional acrylic polyol, namely, a mixture of ethyl acrylate, methyl methacrylate, and hydroxyethyl acrylate or methacrylate, which polyol has been cured with a methylated melamine resin. Retroreflective sheeting of this type is illustrated in FIG. 2 of U.S. Pat. No. 4,025,674 (Mizuochi). A different example uses a single-layer top coat which is a hydroxy-functional acrylic polyol cured with a melamine resin. While the top coats in both examples provide good solvent resistance, they provide only a compromise between toughness and weatherability. Hence, there has been a continuing demand for retroreflective sheeting, the top coat of which is as tough and as solvent resistant as alkyd resin and as weather-resistant as acrylic polyesters.

U.S. Pat. No. 3,190,178 (McKenzie) discloses retroreflective sheeting which is currently called "high intensity" or "encapsulated-lens" retroreflective sheeting. As illustrated in the patent, the retroreflective sheeting has a transparent cover film which is sealed to the face of the sheeting in a geometric pattern. Between narrow sealed areas are relatively broad unsealed areas wherein the front surfaces of the microspheres are optically exposed to an air interface. The patent says that a preferred transparent cover film is biaxially-oriented methyl methacrylate and lists other useful self-supporting transparent films at col. 5, lines 52–62. In such an encapsulated-lens retroreflective sheeting, the cover film serves as a top coat, but none of those named in the patent is as tough and as solvent resistant as alkyd resin and as weather-resistant as acrylic polyesters.

U.S. Pat. No. 3,689,346 (Rowland) discloses composite retroreflective sheeting in which minute, closely spaced cube-corner formations, are adhered to a separate film. The film serves as the "body portion" of the sheeting, and light rays entering the front surface of the film or body portion are reflected by the cube-corner formations. The body portion of this cube-corner retroreflective sheeting serves as its top coat, and preferred resins for the body portion are listed at col. 9, lines 24–27. Some of these have good solvent resistance, but none have good resistance to weathering. In other constructions a top coat can be applied over the body portion of a cube-corner retroreflective sheeting.

SUMMARY OF THE INVENTION

The retroreflective sheeting of the invention is believed to be the first to have a top coat which is as tough and solvent resistant as alkyd resin and as weather resistant as acrylic polyesters. Its resistance to abrasion is at least as good as the best alkyd resins and far better than acrylic polyesters. This new flat transparent top coat is made from a mixture of hydroxy-functional acrylic polyol, as a curing agent for the polyol, aliphatic polyfunctional isocyanate such as the biuret of 1,6-hexamethylene diisocyanate.

Because isocyanates are toxic, those such as 1,6-hexamethylene diisocyanate which may be volatile are preferably partially polymerized with water to form biurets of lower volatility. Particularly useful is the biuret of 1,6-hexamethylene diisocyanate, which is sold by Mobay Chemical Corp. as "Desmodur N" and has a functionality of about 3. Preferably the functionality of the aliphatic polyfunctional isocyanate is between 2 and 4, above which the top coat may be brittle. Aliphatic polyfunctional isocyanates below having functionalities below 2 and above 4 can be mixed to produce top coats of quality equal to that obtained with a single aliphatic isocyanate having the preferred functionality between 2 and 4.

In forming biurets, the equivalent weight should not be allowed to rise to the extent that the top coat may have diminished transparency. The biuret of 1,6-hexamethylene diisocyanate might no longer be fully compatible with the polyol if its equivalent weight exceeds 260 and hence might not provide a transparent top coat.

Another technique for reducing the volatility of isocyanates is to convert them to isocyanurate trimers. As compared to the biurets, the isocyanurate trimers tend to have lower viscosity. A preferred isocyanate is the isocyanurate trimer of 1,6-hexamethylene diisocyanate, available from Mobay as "KL5-2444" and described in U.S. Pat. No. 4,379,905.

Included among alphatic polyfunctional isocyanates are cycloaliphatic isocyanates (such as described in U.S. Pat. Nos. 4,439,370; 4,338,256; 3,912,754; and 4,360,603) and isocyanates which function as if they were aliphatic such as isomers of tetramethylxylylene diisocyanate. Those isomers have aromatic rings which are not bonded directly to the isocyanate group but are bonded to a hydrogen-free carbon atom (such as described in U.S. Pat. Nos. 4,377,530; and 4,379,767). Preferred cycloaliphatic isocyanates include 3-isocyanatomethyl-3,5,5-trimethyl cyclohexylisocyanate produced by Veba-Chemi and dicyclohexylmethane-4,4'-diisocyanate produced by Mobay as "Desmodur W".

Preferably the isocyanate is used in an amount from 0.5 to 1.5 equivalents per equivalent of the hydroxy-functional acrylic polyol. Below 0.5, the polyol might not be converted to sufficient hardness and toughness, whereas above 1.5, some of the isocyanate might not become reacted with the polyol and any unreacted isocyanates might be slowly crosslinked by water, thus rendering an undesirable brittleness to the top coat.

Preferred starting materials for the hydroxy-functional acrylic polyol are (1) esters of methacrylic acid, especially methyl methacrylate, (2) an acrylic acid ester having at least four carbon atoms in its ester group, and (3) a hydroxy-functional acrylate or methacrylate. These should be so selected that the polyol has an effective $T_g$ of from $-20°$ to $30°$ C. Below that range, the top coat may be undesirably soft, whereas above that range, it may be undesirably brittle. A preferred range is from $-10°$ to $10°$ C. The starting materials also should be so selected that the effective hydroxy equivalent weight of the polyol is from 350 to 2500, preferably from 600 to 1500. At less than 350, the top coat might be too hard, and at more than 2500, the top coat might be too soft. A preferred range is from 600 to 1500. The hydroxy-functional acrylic polyol may be a mixture of polyols, some of which may have an equivalent weight below 350 and others, above 2500, together having a effective hydroxy equivalent weight between 350 and 2500 and together having an effective $T_g$ between $-20°$ C. and $20°$ C.

In selecting starting materials for the hydroxy-functional acrylic polyol, an acrylate having at least four carbon atoms in the ester group, such as n-butyl acrylate, lends both toughness and reduced water absorption to the top coat. To provide a desirably hard surface, the starting materials preferably include methyl or ethyl methacrylate. Other vinyl monomers such as styrene, vinyl acetate, acrylonitrile, acrylic acid, acrylamide, and itaconic acid may also be used in making the acrylic polyol, preferably in combination with the 3 classes of starting materials mentioned above. When so combined, such other vinyl monomers preferably constitute not more than 10 molar percent of total monomers. When the top coat is to be pigmented, some added vinyl monomers such as acrylic acid and itaconic acid can improve compatibility between the pigment and the top coat material.

As in the prior art, the top coat is enclosed-lens retroreflective sheeting of the invention may be formed by coating, spraying or dipping from solution onto the bead-bond layer as in U.S. Pat. No. 2,407,680, or it can be preformed, e.g., by extrusion or by casting a solution onto a carrier web having a low-adhesion surface. When preformed, a bead-bound layer can be formed on the top coat as described in U.S. Pat. No. 2,407,680 at the top of col. 12 and illustrated FIG. 3. Also, as in the prior art, a preformed bead-bond layer can be laminated to a preformed top coat by a transparent adhesive layer or simply by applying pressure while thermosoftening the surface of the bead-bond layer.

The top coat must be preformed for encapsulated-lens retroreflective sheeting of the invention. The top coat of cube corner retroreflective sheeting of the invention can either be coated onto the body portion or preformed and laminated to the body portion.

As in the prior art, the retroreflective sheeting of the invention may have a dual-layer top coat, the outer layer being relatively hard to provide good resistance to abrasion, and the inner layer being softer to make the sheeting more conformable. Since the outer layer of a dual-layer top coat provides the desired solvent resistance, abrasion resistance and weather resistance, the inner layer may be one of the softer materials used in top coats of the prior art. When each layer of a dual-layer top coat is made from a mixture of a hydroxy-functional acrylic polyol and an aliphatic polyfunctional isocyanate, the polyol used in making the outer layer preferably has a $T_g$ from about $0°$ to $30°$ C., and that used in making the inner layer preferably has a $T_g$ from about $-20°$ to $0°$ C. A polyol which has a $T_g$ below $0°$ C. can afford to the inner layer a softening point that is sufficiently low that by thermosoftening the inner layer, it may be laminated to the outer layer and also to the bead-bond layer without any intermediate adhesive.

Whether single-layer or dual-layer, the thickness of the top coat preferably is at least 0.05 mm. Substantially thinner top coats may deform and lose surface smoothness upon weathering. There is no advantage to employing thicknesses above about 0.2 mm, and to do so may be wasteful of materials.

Regardless of the manner in which the top coat or a layer thereof is formed, a masking or blocking agent may be employed to block the reactivity of the isocyanate. Known blocking agents include phenol, lactam, oxime, active methylene, alcohol, mercaptan, acid amide, imide, amine, imidazole, urea, carbonate, imine, and sulfite types. The first four of those types are especially advantages. Preferably, blocking agents are avoided, because some of them discolor and some require rather high dissociation temperatures which might cause discoloration from other materials in the composition, e.g., stabilizers, antioxidants, and colorants. Furthermore, the time required to unblock the isocyanate can reduce production rates.

Figure 1:
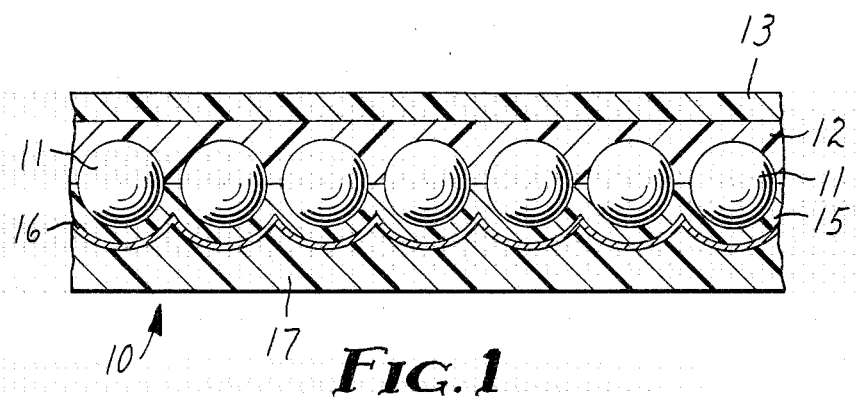
FIG. 1 is an enlarged schematic cross section through an enclosed-lens retroreflective sheeting of the invention having a single top coat.

The retroreflective sheeting 10 shown in FIG. 1 has a monolayer of glass microspheres 11 partially embedded in a transparent bead-bond layer 12 and a flat transparent top coat 13. Beneath the glass microspheres is a space coat layer 15, a specularly reflective layer 16 such as aluminum, and a pressure-sensitive adhesive layer 17.

Figure 2:
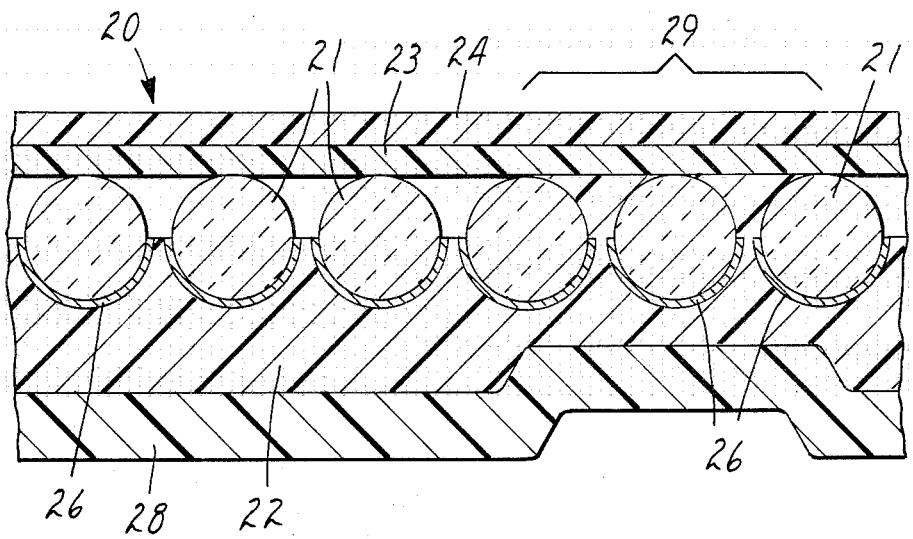
FIG. 2 is an enlarged schematic cross section through an encapsulated-lens retroreflective sheeting of the invention having a dual-layer top coat.

The retroreflective sheeting 20 shown in FIG. 2 has
a monolayer of glass microspheres 21,
a transparent or pigmented bead-bond layer 22,
an inner transparent top coat 23,
an outer transparent top coat 24, and
specularly reflective layers 26, and a
low-adhesion carrier web 28 which prevents sticking in the die used to form a grid of hermetically sealed areas 29.

To comment on the schematic nature of FIG. 2, glass microspheres rarely will be of uniform size, and the thicknesses of the layers of the retroreflective sheeting may vary from area to area. The inner top coat 23 may be in tangential contact with some of the underlying microspheres or not, depending on a host of incidental factors. Each hermetically sealed area 29 (although less than 1 mm in breadth) extends across a large number of the microspheres 11.

Certain hydroxy-functional acrylic polyols A-J used in making top coats for retroreflective sheeting of the invention are listed in Table I.

TABLE I

| Polyol | MMA | BA | HPA | HEA | Styrene | Tg (°C.) | Equiv. Wgt. |
|---|---|---|---|---|---|---|---|
| A | 45.3 | 41.0 | 13.7 | — | — | −2 | 950 |
| B | 53.7 | 40.6 | 5.7 | — | — | 15 | 1258 |
| C | 43.8 | 35.2 | 21.0 | — | — | 11 | 492 |
| D | 44.7 | 50.9 | 4.4 | — | — | 0.5 | 1594 |
| E | 39.1 | 43.8 | 17.1 | — | — | −0.5 | 556 |
| F | 21.4 | 51.4 | 27.2 | — | — | −20 | 363 |
| G | 16.9 | 61.7 | 21.4 | — | — | −27 | 525 |
| H | 23.8 | 71.4 | 4.8 | — | — | −32 | 1142 |
| I | 40.5 | 47.3 | — | 12.0 | — | −10 | 795 |
| J | 22.0 | 30.0 | — | 27.0 | 21.0 | 20 | 600 |

MMA = Methyl methacrylate
BA = Butyl acrylate
HPA = Hydroxy propyl acrylate
HEA = Hydroxy ethyl acrylate.

Also used in making top coats useful for retroreflective sheeting of the invention are polyols K-O listed in Table II, each of which is a blend of hydroxy-functional acrylic polyols. The Tg reported for teach blend is estimated from each Tg of the blended polyols.

TABLE II

| Polyol | Blend of | Blend ratio (equivalents) | Blend Equiv. Wt. | Blend Tg (°C.) |
|---|---|---|---|---|
| K | Polyol G | .75 | 544 | −9 |
|   | Polyol J | .25 |  |  |
| L | Polyol G | .67 | 550 | −6 |
|   | Polyol J | .33 |  |  |
| M | Polyol F | .75 | 377 | −6 |
|   | Polyol J | .25 |  |  |
| N | Polyol A | .75 | 863 | 2 |
|   | Polyol J | .25 |  |  |
| O | Polyol I | .75 | 746 | −4 |
|   | Polyol J | .25 |  |  |

Aliphatic polyfunctional isocyanates used in making top coats for retroreflective sheeting of the invention are:

| Isocyanate | |
|---|---|
| A | biuret of 1,6-hexamethylene diisocyanate |
| B | 3-isocyanatomethyl-3,5,5-trimethylcyclohexyl isocyanate |
| C | 4,4'-methylene-dicyclohexyl diisocyanate |
| D | adduct of biuret of 1,6-hexamethylene diisocyanate and 2-butanone oxime |
| E | adduct of biuret of 1,6-hexamethylene diisocyanate and ethyl acetoacetate |
| F | adduct of the isocyanate trimer of 1,6-hexamethylene diisocyanate and t-butyl acetoacetate. |

Preparation of Enclosed-Lens Retroreflective Sheeting

To make each retroreflective sheeting of the examples, a solution of hydroxy-functional acrylic polyol and aliphatic polyfunctional isocyanate was coated onto a release-coated paper web which was then conveyed through an oven at about 150° C. for about 10 minutes to provide a cured top coat having a thickness of about 0.05 mm. Onto the exposed surface of the cured top coat was coated a solution of a bead-bound composition comprising an oil-free synthetic polyester resin and a butylated melamine resin. After this bead-bound layer had dried to a thickness of about 0.025 mm but while in an uncured tacky state, glass microspheres were cascade-coated onto the bead-bond layer to form a monolayer of glass microspheres embedded to 30–40% of their diameters. The glass microspheres had a mean diameter of 75 micrometers with a plus or minus 7.5 micrometer distribution. Their refractive index was 2.2 to 2.3. The bead-containing bead-bond layer was then thermally cured to a non-tacky state by heating to 150° C.

Next, a 25% solids solution comprised of a polyvinylbutyral resin and a butylated melamine resin in a solvent was coated over the bed-containing bead-bond layer and cured at 170° C. for about 10 minutes to form a space coat layer having a thickness of 0.008–0.025 mm. Over space coat layer, a reflective layer of aluminum metal about 100 nm thick was applied by vapor deposition. The release-coated paper web was then stripped away. An adhesive layer was applied to the reflective layer by coating a 0.025 mm thick layer of an aggressive acrylic pressure-sensitive adhesive onto a silicone-treated release liner and pressing the adhesive against the reflective layer.

Testing

In order to eliminate variables inherent in testing retroreflective sheetings of the invention, certain top coats were tested singly by being peeled from th release-coated paper web before applying a bead-bond layer. Both single top coats and retroreflective sheetings having top coats were subjected to tensile testing using ASTM Test Method D882-67. Typically each of the tensile strength and elongation of a single top coat was about twice the value obtained in testing retroreflective sheeting incorporating an identical top coat.

Toughness Index

It has been found that the relative toughness of different top coats is roughly proportional to the product of tensile strength and elongation of a single top coat or four times that product when testing retroreflective sheeting. That calculation is reported below as a "Toughness Index."

Reflectance Retention

The "Reflectance Retention" of retroreflective sheeting is determined at a divergent angle of 0.2° and an incident angle of −4° after accelerated weathering over a period of 2000 hours by ASTM Test Method D2565-70.

60° Gloss Retention

The "60° Gloss Retention" of a single top coat is determined by ASTM Test Method D2457-70 after accelerated weathering over a period of 2000 hours by ASTM Test Method D2565-70.

Transparency

The "Transparency" of a single top coat is measured by ASTM Test Method D1746-70.

EXAMPLES 1 AND 2

Two retroreflective sheetings of the invention were prepared as described above under "Preparation of Enclosed-Lens Retroreflective Sheeting"; then tested in comparison to two retroreflective sheetings of the prior art which are called "Control 1" and "Control 2". The materials (and their equivalent ratios) used in making their top coats were:

| | |
|---|---|
| Control 1: | Alkyd resin |
| Control 2: | Polyol A/melamine curing agent |
| Example 1: | Polyol N/isocyanate A (1:1) |
| Example 2: | Polyol N/isocyanate D (1:1) |

EXAMPLE 3

A third enclosed-lens retroreflective sheeting of the invention was prepared as described above under "Preparation of Enclosed-Lens Retroreflective Sheeting" except that the top coat was plasticized polyvinyl chloride film having a thickness of about 0.05 mm and a $T_g$ of about 0° C. This vinyl top coat was overcoated with a solution of Polyol N and Isocyanate A (1:1 equivalent ratio). The coating was dried and cured at 150° C. for 10 minutes to a thickness of about 0.02 mm, thus providing a dual-layer top coat which had a total thickness of about 0.07 mm.

Testing of the retroreflective sheetings is reported in Table III.

TABLE III

| | Elongation (%) | Tensile Strength Kgf/cm² | Toughness Index | Reflectance Retention (%) |
|---|---|---|---|---|
| Control 1 | 40 | 89 | 14240 | 20–25 |
| Control 2 | 8 | 127 | 4064 | 75–80 |
| Example 1 | 70 | 108 | 30240 | 75–80 |
| Example 2 | 80 | 48 | 15260 | * |
| Example 3 | 104 | 139 | 57824 | 75–80 |

*The retroreflective sheeting of Example 2 had a Reflectance Retention of only 45–55%, but microscopic examination revealed deterioration in the space coat layer and that the quality of the top coat was equal to the top coats of Control 2 and Example 1, whereas the top coat of Control 1 was badly deteriorated.

Single Top Coats

Table IV lists materials used in making single top coats which would be useful in making retroreflective sheeting of the invention. Table IV also lists materials (and equivalent ratios) used in making comparative single top coats, i.e., the same materials used in making the Control 1 and Control 2 retroreflective sheetings, and called "C-1" and "C-2" in Table IV.

TABLE IV

| Top Coat | |
|---|---|
| C-1 | Alkyd resin |
| C-2 | Polyol A/melamine curing agent |
| 4 | Polyol A/Isocyanate A (1:1) |
| 5 | Polyol A/Isocyanate B (1:1) |
| 6 | Polyol A/Isocyanate C (1:1) |
| 7 | Polyol N/Isocyanate D (1:1) |
| 8 | Polyol N/Isocyanate E (1:1) |
| 9 | Polyol N/Isocyanate F (1:1) |
| 10 | Polyol B/Isocyanate A (1:1) |
| 11 | Polyol C/Isocyanate A (1:1) |
| 12 | Polyol D/Isocyanate A (1:1) |
| 13 | Polyol E/Isocyanate A (1:1) |
| 14 | Polyol F/Isocyanate A (1:1) |
| 15 | Polyol G/Isocyanate A (1:1) |
| 16 | Polyol H/Isocyanate A (1:1) |
| 17 | Polyol I/Isocyanate A (1:1) |
| 18 | Polyol K/Isocyanate A (1:1) |
| 19 | Polyol L/Isocyanate A (1:1) |
| 20 | Polyol M/Isocyanate A (1:1) |
| 21 | Polyol N/Isocyanate A (1:1) |
| 22 | Polyol O/Isocyanate A (1:1) |

Table V lists materials (and equivalent ratios) used in making a dual-layer single top coat which would be useful in making an enclosed-lens retroreflective sheeting of the invention.

TABLE V

| (Top Coat 23) | |
|---|---|
| Outer layer (thickness 0.0125 mm): | Polyol C/Isocyanate A (1:1) |
| Inner layer (thickness 0.0375 mm): | Polyol I/Isocyanate A (1:1) |

Testing of the single top coats of Tables IV and V is reported in Table VI.

TABLE VI

| Top Coat | Tensile Strength (Kgf/cm²) | Elongation (%) | Toughness Index | Transparency (%) | 60° Gloss Retention (%) |
|---|---|---|---|---|---|
| C-1 | 329 | 30 | 9864 | 95 | 42 |
| C-2 | 225 | 20 | 4509 | 97 | 81 |
| 4 | 125 | 113 | 14125 | 98 | 83 |

TABLE VI-continued

| Top Coat | Tensile Strength (Kgf/cm²) | Elongation (%) | Toughness Index | Transparency (%) | 60° Gloss Retention (%) |
| --- | --- | --- | --- | --- | --- |
| 5 | 62 | 154 | 9548 | 99 | — |
| 6 | 91 | 176 | 16016 | 100 | — |
| 7 | 110 | 154 | 16992 | 90 | 65 |
| 8 | 157 | 142 | 22351 | 97 | 92 |
| 9 | 123 | 80 | 9864 | 97 | — |
| 10 | 132 | 196 | 25893 | 98 | — |
| 11 | 163 | 139 | 22701 | 99 | 95 |
| 13 | 47 | 131 | 6175 | 100 | — |
| 14 | 49 | 92 | 4511 | 99 | — |
| 17 | 117 | 134 | 15644 | 97 | — |
| 18 | 109 | 91 | 9925 | 99 | 98 |
| 19 | 128 | 104 | 13278 | 98 | 100 |
| 20 | 216 | 75 | 16218 | 99 | 100 |
| 21 | 164 | 110 | 18081 | 98 | 89 |
| 22 | 178 | 93 | 16565 | 96 | — |
| 23 | 146 | 76 | 11138 | 96 | — |

While top coats 12, 15 and 16 were too weak to test as single top coats, they should be useful as inner layers of dual-layer top coats of retroreflective sheeting of the invention.

EXAMPLE 4

A cube-corner retroreflective sheeting was made by placing preformed Top Coat 21 (identified above in Table IV) over a film of a thermoplastic polymer and pressing the assembly into a cube-corner mold with heat and pressure. When the thermoplastic polymer had flowed sufficiently to replicate the cube corner mold, and after the assembly had cooled below the heat distortion temperature of the thermoplastic polymer, the pressure was released and the finished cube corner retroreflective sheeting was removed from the mold.

Using a razor blade, an X-cut was made to the depth of the top coat, and an effort was made to peel off the top coat. Since the top coat could not be removed in this manner, it was adjudged to be well adhered to the thermoplastic polymer and hence to be suitable as a weather-resisting covering.

I claim:

1. Retroreflective sheeting have a flat, transparent, tough, solvent-resistant, abrasion-resistant and weather-resistant top coat made form a mixture of hydroxy-functional acrylic polyol and aliphatic polyfunctional isocyanate which serves as curing agent for the polyol, said top coat having a toughness index, defined as the multiplication product of the elongation and tensile strength of the top coat in, respectively, percent and kilograms per square centimeter, of at least 6175.

2. Retroreflective sheeting as defined in claim 1 wherein the isocyanate is used in an amount from 0.5 to 1.5 equivalents per equivalent of the polyol.

3. Retroreflective sheeting as defined in claim 2 wherein the effective $T_g$ of the polyol is from $-20°$ to $30°$ C.

4. Retroreflective sheeting as defined in claim 3 wherein the effective equivalent weight of the polyol is from 350 to 2500.

5. Retroreflective sheeting as defined in claim 4 wherein the isocyanate has been converted to a biuret.

6. Retroreflective sheeting as defined in claim 5 wherein the biuret is the biuret of 1,6-hexamethylene diisocyanate.

7. Retroreflective sheeting as defined in claim 6 wherein the equivalent weight of the biuret when mixed with the polyol is less than 260.

8. Retroreflective sheeting as defined in claim 4 wherein the isocyanate has been converted to isocyanurate trimers.

9. Retroreflective sheeting as defined in claim 4 wherein the aliphatic polyfunctional isocyanate has an aromatic ring which is bonded to a hydrogen-free carbon atom.

10. Retroreflective sheeting wherein the top coat is dual layer, the outer layer being made from a mixture as defined in claim 1.

11. Retroreflective sheeting as defined in claim 10 wherein the outer of said two layers provides good resistance to solvents, abrasion and weathering, and the inner is softer to make the sheeting more conformable.

12. Retroreflective sheeting as defined in claim 11 wherein said inner layer is made from a mixture of hydroxy-functional acrylic polyol and aliphatic polyfunctional isocyanate.

13. Retroreflective sheeting as defined in claim 12, wherein the hydroxy-functional acrylic polyol used in making the outer layer has a $T_g$ from about $0°$ to $30°$ C., and that used in making the inner layer, a $T_g$ from about $-20°$ to $0°$ C.

14. Retroreflective sheeting defined in claim 1 wherein styrene accounts for no more than 10 molar percent of the monomers from which the polyol is formed.

* * * * *